United States Patent
Lee et al.

(10) Patent No.: US 9,377,781 B1
(45) Date of Patent: Jun. 28, 2016

(54) AUTOMATIC DRIVING SYSTEM ABLE TO MAKE DRIVING DECISIONS AND METHOD THEREOF

(71) Applicant: AUTOMOTIVE RESEARCH & TEST CENTER, Changhua County (TW)

(72) Inventors: Chao-Yang Lee, Changhua County (TW); Po-Kai Tseng, Changhua County (TW); Chih-Neng Liang, Changhua County (TW)

(73) Assignee: Automotive Research & Test Center, Changhua County (TW)

(*) Notice: Subject to any disclaimer, the term of this patent is extended or adjusted under 35 U.S.C. 154(b) by 11 days.

(21) Appl. No.: 14/584,334

(22) Filed: Dec. 29, 2014

(51) Int. Cl.
G01C 22/00 (2006.01)
G05D 1/00 (2006.01)
G05D 1/02 (2006.01)

(52) U.S. Cl.
CPC .............. G05D 1/0088 (2013.01); G05D 1/021 (2013.01)

(58) Field of Classification Search
CPC ................................... G05D 1/00; G08G 1/16
USPC ........ 701/23, 24, 26, 301, 400; 340/435, 436, 340/903
See application file for complete search history.

(56) References Cited

U.S. PATENT DOCUMENTS

| 2005/0216171 A1* | 9/2005 | Heinrichs-Bartscher | B60W 30/16 701/96 |
| 2009/0287367 A1* | 11/2009 | Salinger | G05D 1/0246 701/23 |
| 2010/0256909 A1 | 10/2010 | Duggan et al. | |
| 2011/0018737 A1* | 1/2011 | Hsu | G08G 1/161 340/903 |
| 2015/0177007 A1* | 6/2015 | Su | G01C 21/34 701/25 |

FOREIGN PATENT DOCUMENTS

CN 103455034 A 12/2013
TW 201014730 A 4/2010

* cited by examiner

*Primary Examiner* — Luke Huynh
(74) *Attorney, Agent, or Firm* — Rosenberg, Klein & Lee

(57) ABSTRACT

The present invention discloses an autonomous driving system able to make driving decisions and a method thereof, which decide a safer vehicle movement, wherein a processor generates a left-turn signal, a forward signal and a right-turn signal, receives and vectorizes a vehicle movement signal and object movement signals to determine whether one object is a dangerous or non-dangerous object, inputs the results into a corresponding equation to generate dangerous and non-dangerous object weights, substitutes the dangerous and non-dangerous object weights into a space weight equation to calculate left-turn, forward and right-turn lane section weights, uses the lane section weights to generate left-turn, forward and right-turn signal weights, generates a movement signal or a braking signal according to whether a highest one of the signal weights is over or below preset weight.

10 Claims, 4 Drawing Sheets

AUTOMATIC DRIVING SYSTEM ABLE TO MAKE DRIVING DECISIONS AND METHOD THEREOF

BACKGROUND OF THE INVENTION

1. Field of the Invention

The present invention relates to an automatic driving technology, particularly to an autonomous driving system able to make driving decisions and a method thereof, which can determine an optimized movement to avoid barriers.

2. Description of the Related Art

In order to use the road environment more efficiently and enhance driving safety, many vehicle manufacturers have been persistently devoted to developing automatic driving systems or automatic driving assistance systems, which assist drivers to make decisions or even take part in controlling the vehicles, expected to provide preventive measures to avoid traffic accidents.

Normally, an automatic driving system or automatic driving assistance system uses detectors to detect the environment, assisting the driver to control the vehicle or directly controlling the vehicle so as to avoid barriers and reduce the risk of collision. The decision logic of conventional automatic driving system includes 1. If the automatic driving system detects an allowed space, it controls the vehicle to advance toward the allowed space; 2. If the automatic driving system does not detect an allowed space, it generates an alert signal to inform the driver. However, only using information of allowed space to determine safety level is assertive and unreliable and may further increase the complexity in the succeeding computation. Therefore, the conventional decision logic is regarded as unsafe.

Accordingly, the present invention proposes an autonomous driving system able to make driving decisions and avoid barriers and a method thereof to overcome the abovementioned problems.

SUMMARY OF THE INVENTION

The primary objective of the present invention is to provide an autonomous driving system able to make driving decisions and a method thereof, which use a plurality of judgement methods to decrease the complexity of path computation and generate optimized movement instructions to enhance driving safety.

Another objective of the present invention is to provide an autonomous driving system able to make driving decisions and a method thereof, which vectorize all the detected objects to calculate the safety levels of the objects, assign safety weights to the objects according to the safety levels, and work out space weights according to the safety weights, and makes a decision of whether to move left, forward or right according to the space weights.

To achieve the abovementioned objectives, the present invention proposes a driving decision method for an autonomous driving system, which comprises steps: a processor generating a left-turn signal, a forward signal, and a right-turn signal; using a detection device to detect a vehicle movement signal of a vehicle and object movement signals of a plurality of objects; the processor converting the vehicle movement signal into a vehicle movement vector and converting the object movement signals into a plurality of object movement vectors; the processor determining whether the object is dangerous object according to the vehicle movement vector and the object movement vector; if object is dangerous object, generating a dangerous object weight via dividing the time length the vehicle will take to collide with the dangerous object by the sum of the time lengths the vehicle will respectively take to collide with all the objects; if object is not dangerous object, determining the object to be a non-dangerous object, and using the distance between the vehicle and the non-dangerous object to generate a non-dangerous object weight; the processor defining a plurality of left-turn lane sections corresponding to the left-turn signal, defines a plurality of forward lane sections corresponding to the forward signal, and defines a plurality of right-turn lane sections corresponding to the right-turn signal, and determining the weights of the left-turn lane sections, the forward lane sections and the right-turn lane sections according to the dangerous object weights or non-dangerous object weights in the corresponding lanes; the processor using the weights of the left-turn lane sections, the forward lane sections and the right-turn lane sections to generate a right-turn signal weight, a forward signal weights and a left-turn signal weight; the processor taking the highest one of the right-turn signal weight, the forward signal weights and the left-turn signal weight, and determining whether the highest signal weight is over a preset weight; if yes, generating a movement signal corresponding to the direction of the highest signal weight; if no, generating a braking signal.

The present invention also proposes an autonomous driving system able to make driving decisions, which comprises an object detection device generating a plurality of object movement signals; a vehicle movement detection device generating a vehicle movement signal; a storage device storing a dangerous object judgement equation, a dangerous object weight equation, a non-dangerous object weight equation, a space weight equation, and a signal weight equation; and a processor electrically connected with the object detection device, the vehicle movement detection device and the storage device, and generating a left-turn signal, a forward signal, and a right-turn signal. The processor receives the vehicle movement signal and the object movement signals and respectively converts the vehicle movement signal and the object movement signals into a vehicle movement vector and a plurality of object movement vectors. The processor determines whether one object is a dangerous object or non-dangerous object according to the vehicle movement vector and the object movement vector of the object. If the object is a dangerous object, the processor uses the dangerous object weight equation to calculate the dangerous object weight of the dangerous object. If the object is a non-dangerous object, the processor uses the non-dangerous object weight equation to calculate the non-dangerous object weight of the non-dangerous object. The processor substitutes the dangerous object weight or the non-dangerous object weight into the space weight equation to generate the weights of the left-turn lane sections, the forward lane sections and the right-turn lane sections. The processor substitutes the weights of the left-turn lane sections, the forward lane sections and the right-turn lane sections into the signal weight equation to generate a right-turn signal weight, a forward signal weight and a left-turn signal weight. The processor takes the highest one of the left-turn signal weight, the forward signal weights and the right-turn signal weight, and determines whether the highest signal weight is over a preset weight. If the highest signal weight is over a preset weight, the processor generates a movement signal to move the vehicle toward to the direction of the highest signal weight. If the highest signal weight is below the preset weight, the processor generates a braking signal to stop the vehicle.

Below, embodiments are described in detail to make easily understood the objectives, technical contents, characteristics and accomplishments of the present invention.

DETAILED DESCRIPTION OF THE INVENTION

Figure 1:
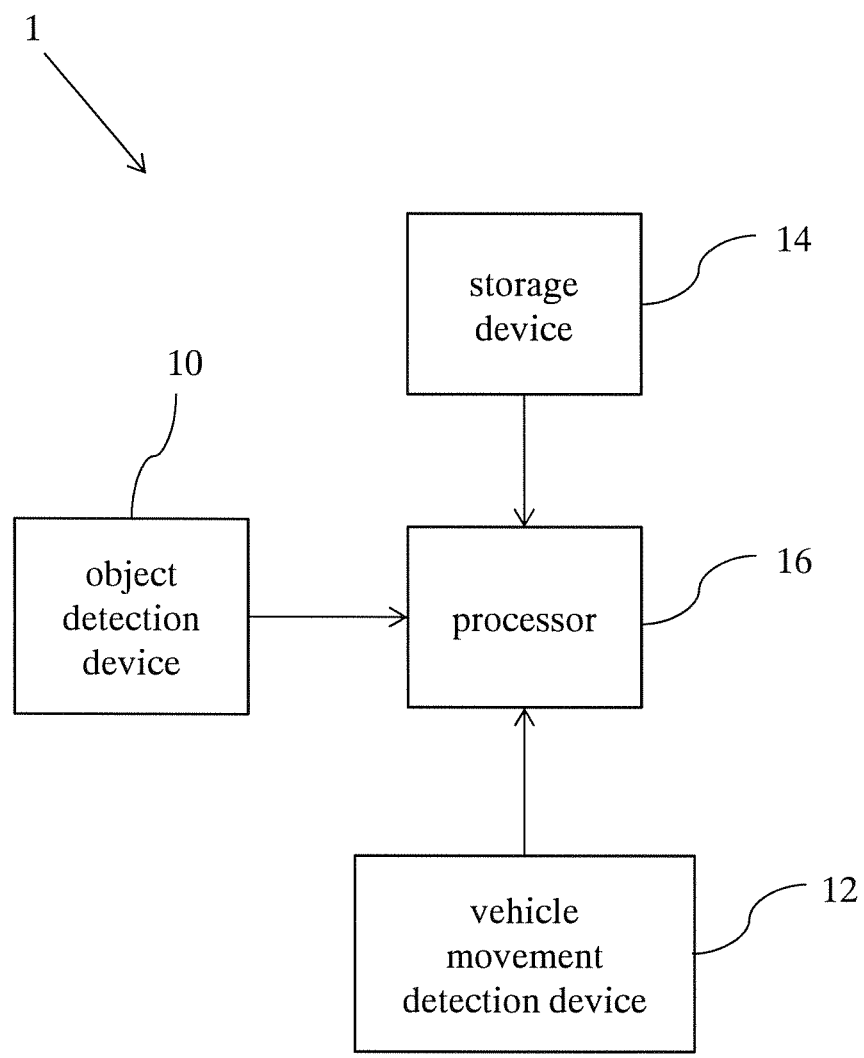
FIG. 1 is a block diagram schematically showing an autonomous driving system able to make driving decisions according to one embodiment of the present invention.

Refer to FIG. 1 a block diagram schematically showing an autonomous driving system able to make driving decisions according to one embodiment of the present invention. The autonomous driving system 1 is installed in a vehicle and comprises detection devices, a storage device 14 and a processor 16. In the embodiment shown in FIG. 1, the detection devices are exemplified by an object detection device 10 and a vehicle movement detection device 12. The object detection device 10 detects the movements of objects except the own vehicle and generates a plurality of object movement signals. The vehicle movement detection device 12 detects the movement of the own vehicle and generates a vehicle movement signal. The storage device 14 stores a dangerous object judgement equation, a dangerous object weight equation, a non-dangerous object weight equation, a space weight equation, and a signal weight equation. The processor 16 is electrically connected with the object detection device 10, the vehicle movement detection device 12 and the storage device 14, receiving the object movement signals and the vehicle movement signal, and retrieving from the storage device 14 the dangerous object judgement equation, the dangerous object weight equation, the non-dangerous object weight equation, the space weight equation, and the signal weight equation. The processor 16 converts the vehicle movement signal into a vehicle movement vector and converts the object movement signals into a plurality of object movement vectors and substitutes the vehicle movement vector and each object movement vector into the dangerous object judgement equation to determine whether one object is a dangerous object. According to whether one object is a dangerous object, the dangerous object weight equation or the non-dangerous object weight equation cooperates with the space weight equation, and the signal weight equation to output an optimized movement path.

Figure 2:
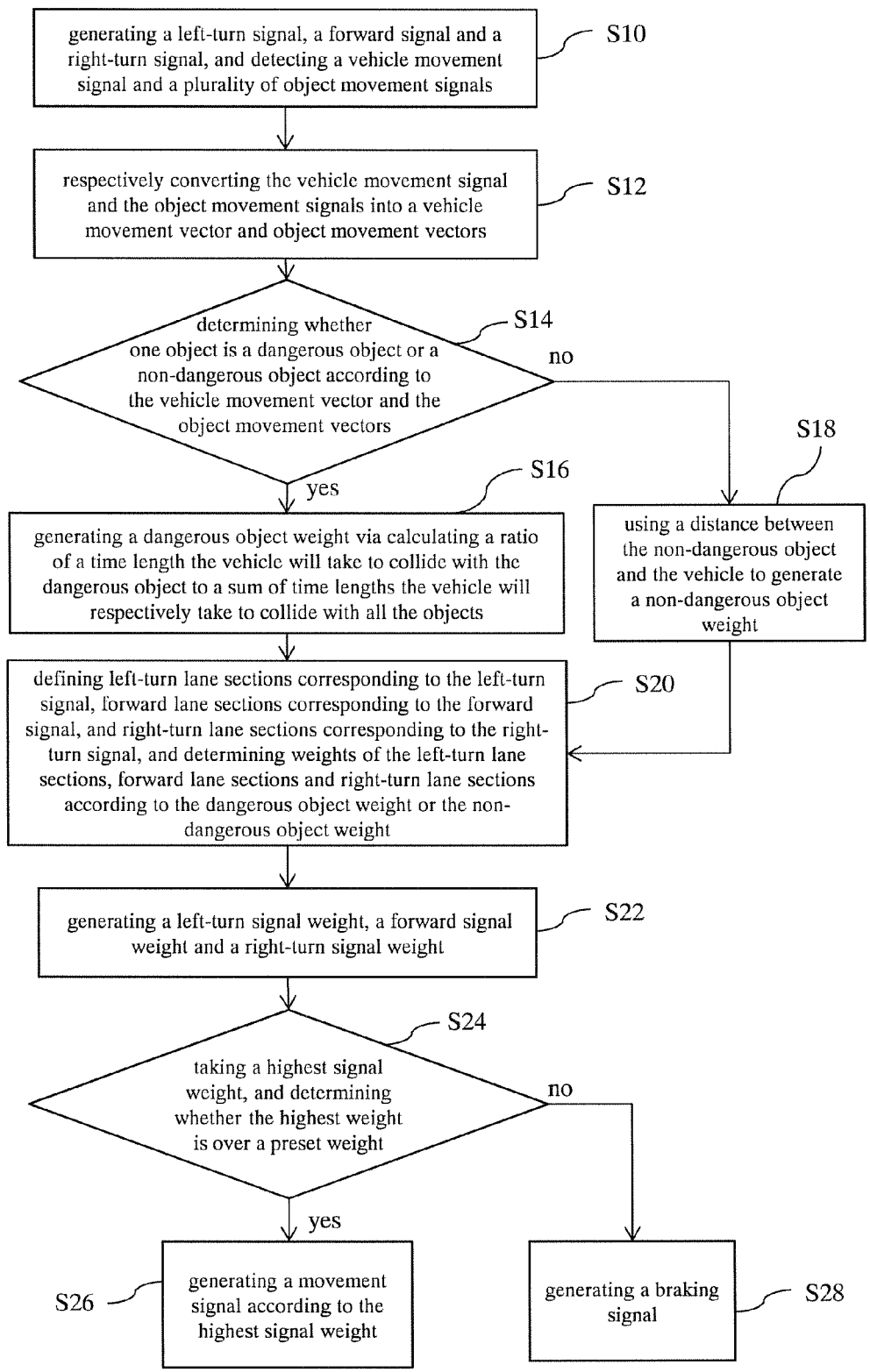
FIG. 2 is a flowchart of the process of a driving decision method for an autonomous driving system according to one embodiment of the present invention.
Figure 3:
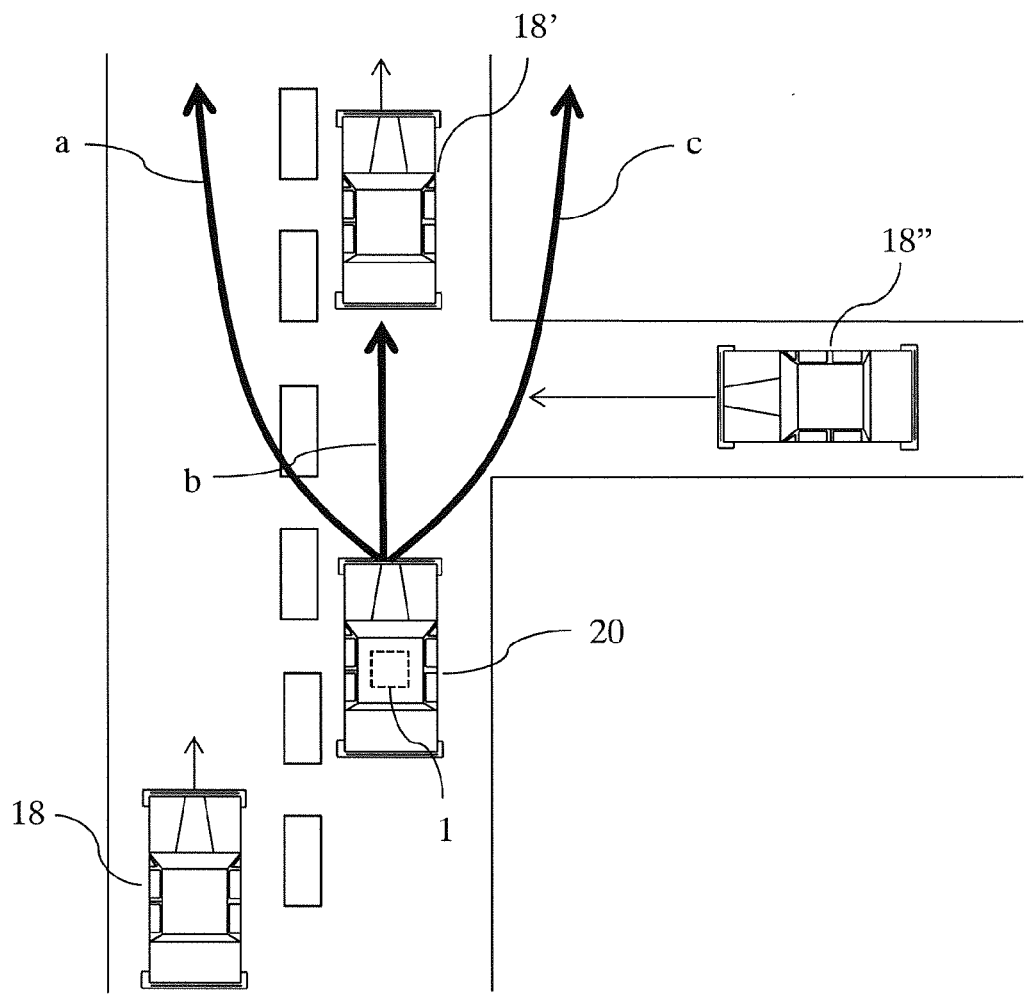
FIG. 3 is a diagram schematically showing a left-turn signal, a forward signal, and a right-turn signal generated by a processor of an autonomous driving system able to make driving decisions according to one embodiment of the present invention.

Refer to FIGS. 1-3. FIG. 2 is a flowchart of the process of a driving decision method for an autonomous driving system according to one embodiment of the present invention. The driving decision method cooperates with the autonomous driving system 1 to realize driving safety. In Step S10, the processor 16 generates a left-turn signal a, a forward signal b, and a right-turn signal c; the object detection device 10 detects the movements of a plurality of objects 18, 18' and 18" surrounding a vehicle 20 and generates a plurality of object movement signals; the vehicle movement detection device 12 detects the movement of the vehicle 20 and generates a vehicle movement signal. In Step S12, the processor 16 receives the vehicle movement signal and the object movement signals and respectively converts the vehicle movement signal and the object movement signals into a vehicle movement vector and a plurality of object movement vectors. In Step S14, the processor 16 retrieves the dangerous object judgement equation from the storage device 14 to determine whether the objects 18, 18' and 18" are dangerous objects one by one via substituting the vehicle movement vector and the object movement vector into the dangerous object judgement equation (1), which is expressed as $$O_U \leftrightarrow [\vec{A} \times \vec{O_1} \neq 0] \cup [(\vec{A} \times \vec{O_1}=0) \cap (\vec{A} \cdot \vec{O_1}<0)] \cup [(\vec{A} \times \vec{O_1}=0) \cap (|(\vec{A}-\vec{O_1})|<\delta)] \quad (1)$$

wherein $\vec{A}$ is the vehicle movement vector, $\vec{O_1}$ the object movement vector, and $\delta$ a preset distance. $\vec{A} \times \vec{O_1} \neq 0$ is to determine whether the vehicle 20 is parallel to the object 18, 18' or 18"; if they are parallel, $\vec{A} \times \vec{O_1}$ equals zero; if they are not parallel, $\vec{A} \times \vec{O_1}$ does not equal zero. $(\vec{A} \cdot \vec{O_1}<0)$ is to determine whether the vehicle 10 and the objects 18, 18' or 18" run in an identical direction or in opposite directions; if $\vec{A} \cdot \vec{O_1}$ is greater than zero, they runs in an identical direction; if $\vec{A} \cdot \vec{O_1}$ is smaller than zero, they runs in opposite directions and may collide. $|(\vec{A}-\vec{O_1})|<\delta$ is to determine whether the distance between the vehicle 20 and the object 18, 18' or 18" is smaller than a preset distance; if the distance between the vehicle 20 and the object 18, 18' or 18" is smaller than the preset distance, the vehicle 20 is too near the object 18, 18' or 18" and may collide with the object 18, 18' or 18". $[\vec{A} \times \vec{O_1} \neq 0]$ indicates that the vehicle 20 is not parallel to the object 18, 18' or 18". $[(\vec{A} \times \vec{O_1}=0) \cap (\vec{A} \cdot \vec{O_1}<0)]$ indicates that the vehicle 20 and the object 18, 18' or 18" are parallel but run in opposite directions. $[(\vec{A} \times \vec{O_1}=0) \cap (|(\vec{A}-\vec{O_1})|<\delta)]$ indicates that the vehicle 20 is parallel to the object 18, 18' or 18" but the distance therebetween are below the preset distance. If the object is a front one, the preset distance is set to be the space gap therebetween. If the object is at the left side or the right side of the vehicle 20, the preset distance is set to be a spacing of two lanes. As long as one of the abovementioned conditions is established, the object 18, 18' or 18" is regarded as a dangerous object. After one of the objects 18, 18' and 18" is determined to be a dangerous object, the process proceeds to Step S16. In the embodiment, the objects 18' and 18" are the dangerous objects. In Step S16, the processor 16 retrieves the dangerous object weight equation from the storage device 14 to calculate the weights of the dangerous objects 18' and 18". The dangerous object weight equation (2) is expressed as $$W_U = \frac{C_U}{C_t} \quad (2)$$

wherein $W_U$ is the weight of the dangerous object 18' or 18", $C_U$ the time length the vehicle 20 will take to collide with the dangerous object 18' or 18', and $C_t$ the sum of the time lengths the vehicle will respectively take to collide with all the objects 18, 18' and 18". In other words, the processor 16 generates the weights of the dangerous object 18' or 18" via calculating the ratio of the time length that the vehicle 20 will take to collide with the dangerous object 18' or 18' to the sum of the time lengths that the vehicle will respectively take to collide with all the objects 18, 18' and 18".

In Step S14, none of the criterions in the dangerous object judgement equation (1) is established for the object 18 in the embodiment. It indicates that the object 18 is a non-dangerous object, and the process proceeds to Step S18. In Step S18, the processor 16 retrieves the non-dangerous object weight equation from the storage device 14 to calculate the weight of the non-dangerous object 18. The non-dangerous object weight equation (3) is expressed as $$W_N = \mu | \mu \propto d \qquad (3)$$

wherein $W_N$ is the weight of the non-dangerous object 18, d the distance between the vehicle 20 and the non-dangerous object 18, μ a constant generated according to d and proportional to d. Normally, the weight of a non-dangerous object is greater than the weight of a dangerous object.

After the weights of the dangerous objects 18' and 18" and the weight of the non-dangerous object 18 are respectively generated in Step S16 and Step S18, the process proceeds to Step S20. In Step S20, the processor 16 defines a plurality of left-turn lane sections 32 corresponding to the left-turn signal a, defines a plurality of forward lane sections 34 corresponding to the forward signal b, and defines a plurality of right-turn lane sections 36 corresponding to the right-turn signal c. Next, the processor 16 retrieves the space weight equation from the storage device 14 to calculate the weights of all the left-turn lane sections 32, forward lane sections 34 and right-turn lane sections 36. The space weight equation (4) is expressed as $$W_R = \arg\min_{W_O} D_O + \phi | \phi \propto D_O \qquad (4)$$

wherein $W_R$ is the weight of a lane section, $W_O$ the weight of a dangerous or non-dangerous object, $D_O$ the distance between the object and the center of the lane section, φ a constant proportional to $D_O$. In Step S20, the processor 16 retrieves the weights of the objects 18, 18' and 18" nearest to the lane sections the vehicle 20 may pass through among the left-turn lane sections 32, forward lane sections 34 and right-turn lane sections 36; the processor 16 also calculates a value proportional to the distance between the object 18, 18' or 18" and the center of a lane section. For example, the object 18 is nearest to the center of the left-turn lane section 32' of the left-turn lane sections 32; the processor 16 thus retrieves the non-dangerous weight of the non-dangerous object 18; the processor 16 calculates the constant φ of the object 18 and the left-turn lane section 32'; then the processor 16 adds the constant to the non-dangerous weight of the non-dangerous object 18 to output the weight of the left-turn lane section 32'. The generation of the weights of the other left-turn lane sections 32 is similar and will not repeat. The weight of each forward lane section 34 is generated via adding the constant φ of the dangerous object 18' and the forward lane section 34 to the dangerous object weight of the dangerous object 18'. The weight of each right-turn lane section 36 is generated via adding the constant φ of the dangerous object 18" and the right-turn lane section 36 to the dangerous object weight of the dangerous object 18".

Next, the process proceeds to Step S22. In Step S22, the processor 16 retrieves the signal weight equation and uses the weights of the left-turn lane sections 32 that the left-turn signal a passes through, the forward lane sections 34 that the forward signal b passes through, and the right-turn lane sections 36 that the right-turn signal c passes through to respectively acquires a left-turn signal weight, a forward signal weight and a right-turn signal weight according to the signal weight equation (5), which is expressed as $$B_i = \min W_R \qquad (5)$$

wherein $W_R$ is the weight of a lane section, and $B_i$ is the signal weight. The minimum weight of the left-turn lane sections 32, the minimum weight of the forward lane sections 34, and the minimum weight of the right-turn lane sections 36 are used to work out the left-turn signal weight, the forward signal weight and the right-turn signal weight. For example, as the object 18 runs forward in the left-turn lane sections 32 and 32', the vehicle 20 will collide with the object 18 in the left-turn lane section 32' if the vehicle 20 advances according to the left-turn signal a. Therefore, the left-turn lane section 32' is regarded as the most dangerous left-turn section among the plurality of left-turn lane sections 32. The process is to evaluate the overall safety of the related path. Thus, the weight of the most dangerous left-turn lane section 32' is used as the left-turn signal weight that represents the safety level of the path related to the left-turn signal a.

Figure 4:
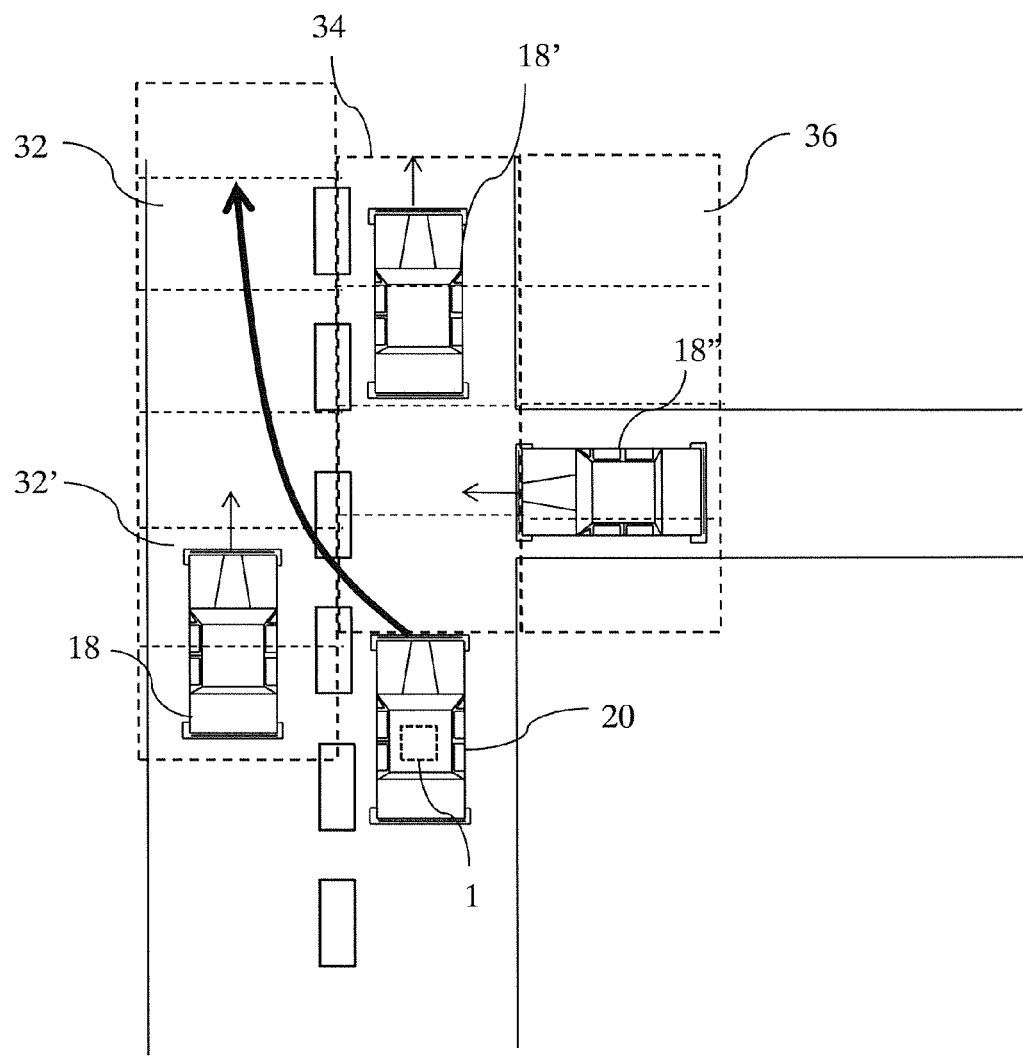
FIG. 4 is a diagram schematically showing the decision making of a movement signal according to one embodiment of the present invention.

Next, the process proceeds to Step S24. In Step S24, the processor 16 compares the left-turn signal weight, the forward signal weight and the right-turn signal weight and acquires the highest one therefrom. In the embodiment shown in FIG. 4, the left-turn signal a has the highest signal weight. Next, the processor 16 determines whether the left-turn signal weight is greater than a preset weight. If the left-turn signal weight is greater than the preset weight, the process proceeds to Step S26. In Step S26, the processor 16 generates a movement signal to make the vehicle 20 move according to the left-turn signal a. If the left-turn signal weight is smaller than the preset weight, the process proceeds to Step S28. In Step S28, the processor 16 generates a braking signal to stop the vehicle 20.

In conclusion, the present invention uses a plurality of judgement procedures to decide a safer movement action for a vehicle, including procedures of vectorizing all the detected objects to facilitate judging the safety levels of the detected objects and using the outputs to calculate the space safety levels of the lanes to facilitate making a decision about whether to turn left, forward or right, or brake the vehicle. The present invention not only effectively enhances driving safety but also obviously decreases computation complexity of path decision.

The embodiments described above are only to exemplify the present invention but not to limit the scope of the present invention. Any equivalent modification or variation according to the spirit of the present invention is to be also included within the scope of the present invention.

What is claimed is:

1. A driving decision method for an autonomous driving system, comprising steps:
    a processor generating a left-turn signal, a forward signal and a right-turn signal, and a detection device detecting a vehicle movement signal of a vehicle and a plurality of object movement signals of a plurality of objects;
    said processor respectively converting said vehicle movement signal and said object movement signals into a vehicle movement vector and a plurality of object movement vectors;
    said processor determining whether one said object is a dangerous object or a non-dangerous object according to said vehicle movement vector and said object movement vectors, and generating a dangerous object weight or a non-dangerous object weight according to whether said object is said dangerous object or said non-dangerous object;
    said processor defining left-turn lane sections corresponding to said left-turn signal, forward lane sections corresponding to said forward signal, and right-turn lane sections corresponding to said right-turn signal, and determining left-turn lane section weights, forward lane section weights and right-turn lane section weights according to said dangerous object weight or said non-dangerous object weight of one said danger object or one said non-dangerous object, which will pass through one corresponding said lane section; and said processor generating a left-turn signal weight, a forward signal weight and a right-turn signal weight, and taking a highest signal weight therefrom, and determining whether said highest signal weight is over a preset weight;

if yes, said processor generating a movement signal according to said left-turn signal, said forward signal or said right-turn signal, which has said highest signal weight; and if no, said processor generating a braking signal.

2. The driving decision method for an autonomous driving system according to claim 1, wherein said processor determines whether one said object is said dangerous object or said non-dangerous object according to a dangerous object judgement equation expressed as $$O_U \leftrightarrow [\vec{A} \times \vec{O_1} \neq 0] \cup [(\vec{A} \times \vec{O_1} = 0) \cap (\vec{A} \cdot \vec{O_1} < 0)] \cup [(\vec{A} \times \vec{O_1} = 0) \cap (|(\vec{A} - \vec{O_1})| < \delta)]$$

wherein $\vec{A}$ is said vehicle movement vector, $\vec{O_1}$ said object movement vector, and $\delta$ a preset distance.

3. The driving decision method for an autonomous driving system according to claim 1, wherein if said object is one said dangerous object, said processor generates said dangerous object weight via calculating a ratio of a time length said vehicle will take to collide with said dangerous object to a sum of time lengths said vehicle will respectively take to collide with all said objects according to a dangerous object weight equation expressed as $$W_U = \frac{C_U}{C_t}$$

Wherein $W_U$ is said dangerous object weight, $C_U$ said time length said vehicle will take to collide with said dangerous object, and $C_t$ said sum of said time lengths said vehicle will respectively take to collide with all said objects; and wherein if said object is one said non-dangerous object, said processor uses a distance between said non-dangerous object and said vehicle to generate said non-dangerous object weight according to a non-dangerous object weight equation expressed as $$W_N = \mu | \mu \propto d$$

wherein $W_N$ is said non-dangerous object weight, d said distance between said non-dangerous object and said vehicle, and $\mu$ a constant generated according to d and proportional to d.

4. The driving decision method for an autonomous driving system according to claim 1, wherein said processor uses said dangerous object weights and said non-dangerous object weights to determine said left-turn lane section weights, said forward lane section weights and said right-turn lane section weights according to a space weight equation expressed as $$W_R = \arg\min_{W_O} D_O + \varphi \mid \varphi \propto D_O$$

wherein $W_R$ is said left-turn lane section weight, said forward lane section weight or said right-turn lane section weight, $W_O$ said dangerous object weight or said non-dangerous object weight, $D_O$ a distance between said object and a center of said left-turn lane section, said forward lane section or said right-turn lane section, and $\varphi$ a constant proportional to $D_O$.

5. The driving decision method for an autonomous driving system according to claim 1, wherein said processor generates said left-turn signal weight, said forward signal weight and said right-turn signal weight via respectively substituting said left-turn lane section weights, said forward lane section weights and said right-turn lane section weights into a signal weight equation expressed as $$B_i = \min W_R$$

wherein $W_R$ is said left-turn lane section weight, said forward lane section weight or said right-turn lane section weight, and $B_i$ is said left-turn signal weight, said forward signal weight or said right-turn signal weight.

6. An autonomous driving system able to make driving decisions, comprising:
an object detection device detecting a plurality of object movement signals of a plurality of objects;
a vehicle movement detection device detecting a vehicle movement signal of a vehicle;
a storage device storing a dangerous object judgement equation, a dangerous object weight equation, a non-dangerous object weight equation, and a space weight equation; and
a processor electrically connected with said object detection device, said vehicle movement detection device and said storage device, wherein said processor generates a left-turn signal, a forward signal, and a right-turn signal, retrieves said vehicle movement signal and said object movement signals, and respectively converts said vehicle movement signal and said object movement signals into a vehicle movement vector and a plurality of object movement vectors; said processor determines whether one said object is a dangerous object according to said vehicle movement vector and said object movement vector and calculates a dangerous object weight or a non-dangerous object weight; said processor retrieves said space weight equation and substitutes said dangerous object weights or said non-dangerous object weights into said space weight equation to calculate left-turn lane section weights corresponding to said left-turn signal, forward lane section weights corresponding to said forward signal and right-turn lane section weights corresponding to said right-turn signal, and generates a left-turn signal weight, a forward signal weight and a right-turn signal weight; said processor takes a highest signal weight from said left-turn signal weight, said forward signal weight and said right-turn signal weight, and determines whether said highest signal weight is over a preset weight; if said highest signal weight is over said preset weight, said processor generates a movement signal to make said vehicle advance according to said left-turn signal, said forward signal or said right-turn signal, which has said highest signal weight; if said highest signal weight is below said preset weight, said processor generates a braking signal to stop said vehicle.

7. The autonomous driving system able to make driving decisions according to claim 6, wherein said processor determines whether one said object is said dangerous object or said non-dangerous object according to said dangerous object judgement equation expressed as $$O_U \leftrightarrow [\vec{A} \times \vec{O_1} \neq 0] \cup [(\vec{A} \times \vec{O_1} = 0) \cap (\vec{A} \cdot \vec{O_1} < 0)] \cup [(\vec{A} \times \vec{O_1} = 0) \cap (|(\vec{A} - \vec{O_1})| < \delta)]$$

wherein $\vec{A}$ is said vehicle movement vector, $\vec{O_1}$ said object movement vector, and $\delta$ a preset distance.

8. The autonomous driving system able to make driving decisions according to claim 6, wherein if said object is one said dangerous object, said processor generates said dangerous object weight via calculating a ratio of a time length said vehicle will take to collide with said dangerous object to a sum of time lengths said vehicle will respectively take to collide with all said objects according to a dangerous object weight equation expressed as $$W_U = \frac{C_U}{C_t}$$

wherein $W_U$ is said dangerous object weight, $C_U$ said time length said vehicle will take to collide with said dangerous object, and $C_t$ said sum of said time lengths said vehicle will respectively take to collide with all said objects; and wherein if said object is one said non-dangerous object, said processor uses a distance between said non-dangerous object and said vehicle to generate non-dangerous object weight according to a non-dangerous object weight equation expressed as $$W_N = \mu | \mu \propto d$$

wherein $W_N$ is said non-dangerous object weight, d said distance between said non-dangerous object and said vehicle, and $\mu$ a constant generated according to d and proportional to d.

9. The autonomous driving system able to make driving decisions according to claim 6, wherein said space weight equation is expressed as $$W_R = \arg\min_{W_O} D_O + \varphi \,|\, \varphi \propto D_O$$

wherein $W_R$ is said left-turn lane section weight, said forward lane section weight or said right-turn lane section weight, $W_O$ said dangerous object weight or said non-dangerous object weight, $D_O$ a distance between said object and a center of said left-turn lane section, said forward lane section or said right-turn lane section, and $\varphi$ a constant proportional to $D_O$.

10. The autonomous driving system able to make driving decisions according to claim 6, wherein said storage device further stores a signal weight equation; said processor substitutes said left-turn lane section weights, said forward lane section weights and said right-turn lane section weights to respectively generate said left-turn signal weight, said forward signal weight and said right-turn signal weight according to said signal weight equation, which is expressed as $$B_i = \min W_R$$

wherein $W_R$ is said left-turn lane section weight, said forward lane section weight or said right-turn lane section weight, and $B_i$ is said left-turn signal weight, said forward signal weight or said right-turn signal weight.

* * * * *